(No Model.) 2 Sheets—Sheet 1.
M. W. DEWEY.
METHOD OF ELECTRIC SOLDERING AND CEMENTING CANS.
No. 445,770. Patented Feb. 3, 1891.
Fig. 1.
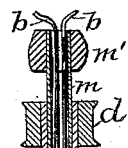
Fig. 2.
Fig. 3.
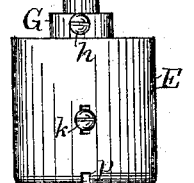
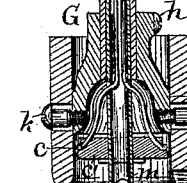
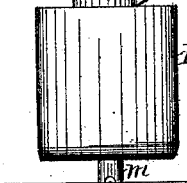
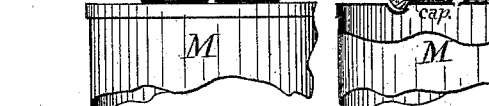
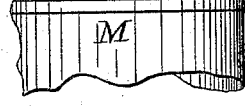
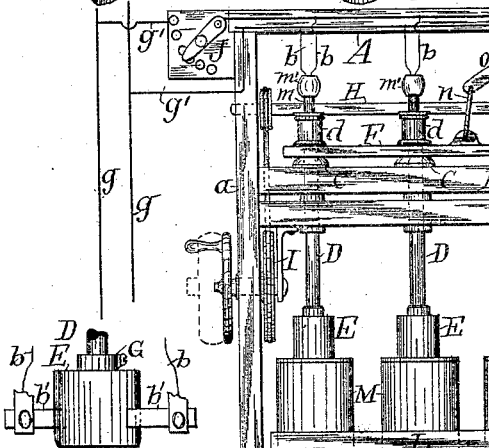
Fig. 4.
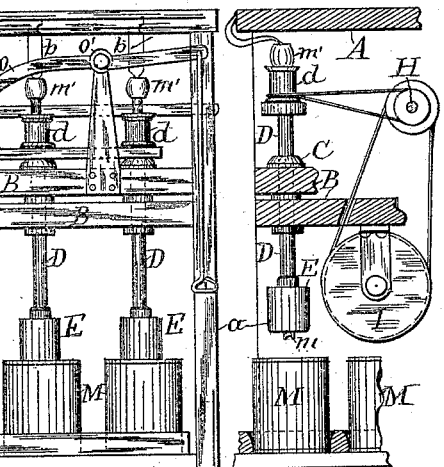
Fig. 5.
Fig. 11.
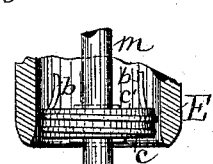
Fig. 6.
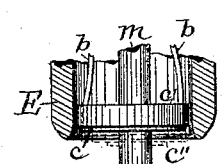
Fig. 7.
Fig. 8.
WITNESSES:
J. J. Laass.
H. M. Seamans
Fig. 9.
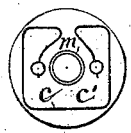
Fig. 10.
INVENTOR,
Mark W. Dewey,
BY
Duell, Laas & Duell
his ATTORNEYS.

(No Model.)　　　　　　　　　　　　　　　　2 Sheets—Sheet 2.
M. W. DEWEY.
METHOD OF ELECTRIC SOLDERING AND CEMENTING CANS.
No. 445,770.　　　　　　　　　Patented Feb. 3, 1891.
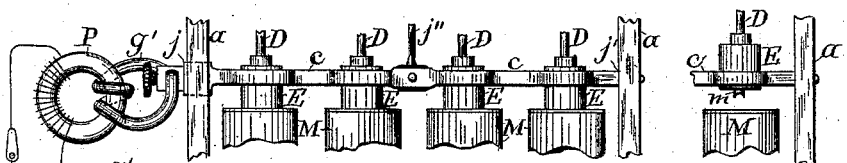
Fig. 12.　　　　　Fig. 13.
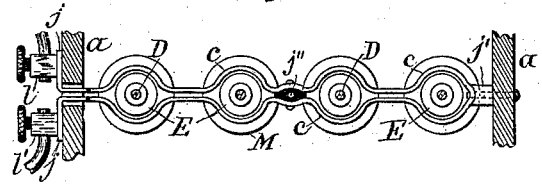
Fig. 14.
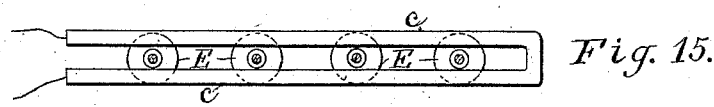
Fig. 15.
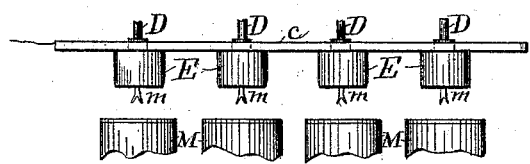
Fig. 16.
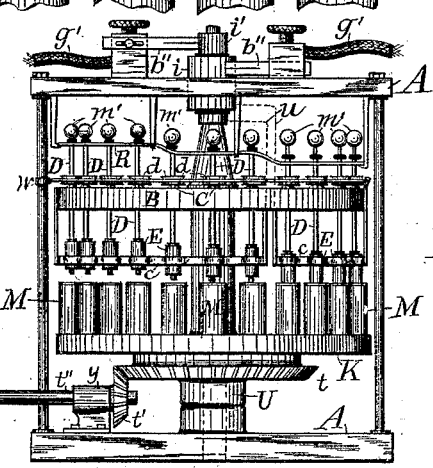
Fig. 17.
WITNESSES:　　　　　　　　　　　　　　　INVENTOR,
J. J. Laass.　　　　　　　　　　　　　　Mark W. Dewey,
C. L. Bendixon　　　　　　　　　　　　　BY
　　　　　　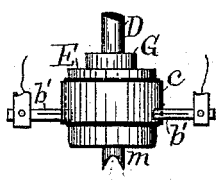　　　Duell, Laass & Bull
　　　　　　Fig. 18.　　　　　　　　his ATTORNEYS
THE NORRIS PETERS CO., PHOTO-LITHO., WASHINGTON, D. C.

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRIC SOLDERING AND CEMENTING CANS.

SPECIFICATION forming part of Letters Patent No. 445,770, dated February 3, 1891.

Application filed September 27, 1890. Serial No. 366,307. (No model.)

*To all whom it may concern:*

Be it known that I, MARK W. DEWEY, of Syracuse, in the county of Onondaga, in the State of New York, have invented new and useful Improvements in the Method of Electric Soldering and Cementing Cans, (Case No. 75,) of which the following, taken in connection with the accompanying drawings, is a full, clear, and exact description.

My invention relates to those methods or processes of uniting the parts of sheet-metal ware, more particularly cans, which require the employment of heat to melt or soften the uniting material and afterward the withdrawal of the heat to cool and set said material.

The object of my invention is to employ electricity as a heating agent for the soldering or cementing irons, so that they may be heated easily to the required temperature and all the irons in a machine heated alike or uniformly, which cannot be accomplished by gas or other heating mediums now employed for this purpose.

The object of my invention also is to heat electrically or by an electric current the soldering-irons of the capping-machines now in use with as little change as possible in their general construction, as the present construction of the machines is highly satisfactory and desirable. Said machines contain revolving cylindrical soldering-irons that are vertically movable and presser-irons that are also vertically movable, but independent of the soldering-irons, so that pressure can be maintained upon the caps of the cans for a certain length of time after the soldering-irons have been removed to permit the solder to cool and the caps to be firmly joined to the cans.

The object of my invention further is, though I do not limit myself thereto, to electrically heat the soldering-irons without passing the current through the said irons themselves, as they are of very low resistance and would require an enormous amount of current to heat them and also heavy and expensive conductors to lead the current to them. The current would have to be specially generated or transformed for the purpose, as ordinary currents employed for lighting and power purposes would not be sufficient. With my invention, however, I am enabled to employ almost any strength of current, as the heating-conductor may be entirely separated from the soldering-iron and constructed of any suitable material and of any desired size or shape to obtain the proper resistance and the best results.

It has heretofore been proposed to soften the solder when soldering lids on cans by passing a heating electric current through a stationary pressure-iron and permitting the solder to cool by cutting off the current before the pressure of the said iron was removed. This plan will not do for capping purposes, as it not only requires a change in the construction of the present capping-machines, but is very inefficient, as there is no revolving iron provided to distribute and sweat the solder in the depression at the joint around the cap and no unheated pressure-iron to maintain pressure upon the cap while the heated iron is removed. The above plan would also occupy too much time, for the reason that the pressure-iron must remain on the cap after the current through it is cut off a sufficient time to lose by conduction a great part of the heat accumulated in it to permit the solder to cool and set before the pressure upon the cap is removed, and if said iron is cooled to this point it will require a strong current or a long flow of current, and consequently a loss of time and energy, to again raise the temperature of the irons for the next set of cans to be soldered or capped.

In my invention it will be observed that no time will be lost in heating and cooling the irons, as the soldering-iron or the heating electric conductor is kept constantly heated and the work is not cooled by interrupting the current, but by removing the heated iron from the work as soon as the solder is properly distributed, &c., and the pressure upon the work is maintained after the removal of the soldering-iron a sufficient time to allow the solder to set and the parts to become united together by a cool and independent pressure-iron.

My invention consists, broadly, in electrically heating a metal tool, suitably applying the solder or cement to the junction of the pieces, bringing the tool in contact with the solder, and then moving the tool along the said junction.

My invention consists, also, in electrically heating a circular soldering-iron, suitably applying the solder to the junction of the cap and can, bringing the iron in contact with the solder and junction, rotating the iron until the solder is properly distributed, then removing the iron from the joint, and maintaining the pressure upon the parts while they are cooling.

My invention consists, further, in heating the soldering-tool by passing a heating electric current through a conductor in contact with or in close proximity to the tool while it is remote from the work, then moving the tool from said conductor and bringing the tool in contact with the work or the junction of pieces supplied with solder, moving said tool along the junction, removing the tool from the junction, and maintaining pressure upon the parts while they are cooling.

My invention consists in certain other combinations of the steps in the method, and also in certain apparatus and devices useful in practicing the method hereinafter described, and specifically set forth in the claims.

In the accompanying drawings, Figure 1 is an elevation of my improved can-capping apparatus as applied to a single can and for use in practicing my method. Fig. 2 is a sectional view of the same, and Fig. 3 is an elevation showing the soldering-iron raised. Fig. 4 is a front view of a machine. Fig. 5 is a sectional side elevation of the same. Figs. 6, 7, 8, 9, 10, 11, and 18 are modified forms of electric heaters that may be employed in accomplishing my invention. Fig. 12 is a front view of a portion of a machine having a simple and preferred form of an electric heating-conductor. Fig. 13 is a portion of the same front view with the iron in a raised position. Fig. 14 is a sectional plan view of Fig. 12. Figs. 15 and 16 are plan and side views of a set of soldering-irons with another form of heating-conductor applied thereto, similar to that shown in Figs. 12, 13, and 14; and Fig. 17 is a side elevation of a rotary can-capping machine for accomplishing my invention.

Referring specifically to the first five figures of the drawings, A is the frame-work of the machine, which may be of any suitable description. $a\ a$ are vertical posts, (shown in Figs. 4 and 5,) to which are secured the bars or plates B, supporting the shaft-bearings C C, which fit therein. The bearings C hold the vertical shafts or tubes D D of the soldering-irons E. It will be obvious that the bearings and their supports may be constructed so that the irons may be separated more or less, as is sometimes done in these machines, to admit cans of different diameter.

The tubes D are provided with pulleys $d$ at their upper ends. Between the pulleys and the upper parts of the bearings C is a perforated or slotted bar F, which is adapted to be raised. At the lower end of each shaft is a sleeve G, having a flange or collar $e$. The sleeve G is held to the shaft by means of a set-screw $h$. The collar $e$ is of the same diameter as the interior of the hollow cylindrical soldering-iron and rests therein, the connection between the two parts being effected by means of the set-screws $k$, which pass through slots cut in the body of the soldering-iron. A presser-rod or tube $m$, having a weight $m'$ at its upper end, passes through the center of each shaft D, the lower end of the tube being adapted to rest upon the top of the can-cap. At the center of the bar F is a link $n$, connected with a lever $o$, having a fulcrum at $o'$, which lever when depressed causes the entire series of soldering devices to be raised. A line of shafting H is arranged in suitable relation to the soldering devices and provided with pulleys and belts for driving the same. Motion is given to the shafting H by means of a belt leading from the wheel I, which may be rotated by any suitable power or means.

K is a sliding table, on which a tray L may be placed. The cans M may be placed on the tray or directly on the sliding table. The presser-iron $m$ is made in the form of a tube in some cases to permit the electric connections $b\ b$ to pass through from the top to the heating-conductor $c$, supported in close proximity to the soldering-iron on its interior and upon the edge or periphery of a disk $c'$, of non-conducting material, as asbestus or mica, fixed to the tube $m$ a distance above the lower end thereof. The said disk $c'$ is chamfered or grooved on its edge to receive and support the heating electric conductor. Any suitable source of electricity can be employed.

$g\ g$ indicate leads from some source, and $g'$ is a circuit connected with the said leads. The circuit contains a current-regulator or adjustable resistance J, and extends along the upper part of the frame of the machine. The heating-conductors $c\ c$ are shown connected in the circuit in parallel; but it will be obvious that they may be connected in circuit, as desired, which depends upon the strength of the current, the resistance of the heating-conductors, and the amount of heat required.

The operation of the machine is as follows: The soldering-irons having been placed the proper distance apart to suit the diameter of the cans to be capped, the current is passed through the heating-conductors. The soldering-irons are then put in motion or caused to revolve. A series of filled cans bearing loose caps and pieces or rings of solder are then prepared for the action of the machine, being either placed directly on the sliding table or in the tray. The lever $o$ is then depressed, whereupon the entire series of soldering devices and pressure rods or tubes are raised sufficiently to allow the cans to go under. The cans being put in position, the soldering devices and presser-tubes are allowed to descend, the latter holding the caps steadily in place. About two or three revolutions of the soldering-irons have been found to be sufficient to complete the operation. The caps having been soldered on, the soldering devices and presser tubes or rods are again raised and the cans slid from under and a second series made ready.

The operating-edge of the soldering-iron is provided with slots $p$, the object being to prevent or obviate the presence of a completely circular edge, which has been found objectionable. The break in the edge allowing the solder to flow both inside and outside of the iron, a more perfect joint is effected than if the edge be a continuous circle.

The soldering-iron may be made of copper, steel, or any other metal best adapted for the purpose.

It will be obvious that any suitable and well-known forms of devices for applying acid, solder or cement applying devices, or cooling devices may be employed with my invention and may be connected to and operated with any apparatus designed for practicing my process. It will be also obvious that any suitable and well-known forms of devices for feeding and withdrawing the articles, as the cans and caps, to and from the machines may be employed with my invention.

Instead of forming the heating-conductor $c$ in the shape of a ring, as indicated in Fig. 2 of the drawings, said conductor may be formed into a coil, as shown in Fig. 6. The disk $c'$ is held in its place upon the tube by pins passed through the tube above and below the said disk. In this figure the soldering-iron is shown in its raised position with its working end opposite or near the heating-conductor.

Should a great number of convolutions of the heating-conductor be necessary in order to generate the amount of heat required, the coil or coils of the conductor may be inclosed in a suitable case $f$, as shown in Fig. 7. Suitable insulating material, as asbestus or pulverized fire-clay, may surround the wire in the case. The said case is ring-shaped, with a recess in the lower portion of its exterior, and is fixed to a hollow sleeve $f'$, secured to the shaft by set-screws. The soldering-iron E is in this case preferably made with a projection on the lower part of its interior to come in contact when raised with the projecting part of the case. It is not absolutely essential, however, that the iron should come in contact with the case, nor that there should be a recess in the latter and a projection on the soldering-iron; but this is preferred in order to rapidly conduct the heat from the case to the iron.

In Fig. 8 the heating-conductor $c$ is shown secured to the under side of the disk $c'$, and may be provided with another disk $c''$, of any suitable material, below the same, if desired, as shown in dotted lines. Figs. 9 and 10 show the shapes the heating-conductor may be placed in when on the under side of the disk. The heating-conductor may be shaped otherwise, however. The bifurcation is made at the lower extremity of the presser-irons in order that the vents usually produced in the caps upon which the irons rest may be uncovered during the process of soldering.

Fig. 11 shows brushes $b'\ b'$, the terminals of the circuit, bearing upon the cylindrical rotatable vertically-reciprocating soldering-tools E to conduct the electric current to and through the iron to heat the same; but, although this may be done, it is not preferred, as the irons would have to be made much lighter than usual to obtain the requisite resistance, or else the current would have to be of very great volume. In this case the iron E would be insulated from the sleeve G, to which it is fastened. Instead of passing the current through the iron itself, it would be better to pass it through a thin band or ring $c$, insulated from but secured upon the exterior of the soldering-iron E, as shown in Fig. 18, as then the resistance of the heating-conductor can be made much higher and a current of smaller volume employed.

In the apparatus hereinbefore described the heating-conductor, although in some cases secured to the presser-iron, is not entirely stationary as the presser-irons are raised and lowered; but in the apparatus hereinafter described said heating-conductor is stationary and extremely simple in form and inexpensive.

The heating-conductor $c$ (shown in Figs. 12, 13, and 14) is secured to and supported by the frame of the machine at $j$ and $j'$, and, if necessary, by one or more supplementary supports $j''$, insulated from the conductor and between $j$ and $j'$. The path of said heating-conductor is shown clearly in Figs. 12 and 14 of the drawings, extending from the binding-post $l$ on the outside of the frame $a$, through the frame, along on one side of the row of soldering-irons, and bowing half round each one to $j'$, where it is secured to a block fastened to the frame $a$, then returning along on the other or front side of the said irons, bowing, as before, around each one, and through the frame again to the binding-post $l'$. The said conductor is in close proximity to the irons, but does not touch them, so that it will not interfere with their movements. The heating-conductor, it will be observed, is placed remote or a considerable distance from the cans, so that it will not materially heat them, or at least will not melt the solder, tin, or cement upon them; but when the irons are raised, as shown in Fig. 13, the working end of the soldering-tool is brought close to the heating-conductor and is heated, so that when it descends upon the solder at the joint it softens or fuses the solder to unite the cap with the can. The heating-conductor is shown in this case in the secondary circuit of an inductional transformer P.

$r$ is the primary circuit, which may be connected with a suitable source of irregular or alternating currents, and $r'$ is a current-regulator or choking-coil to regulate the current in the heating-conductor c in the secondary circuit.

The heating-conductor shown in Figs. 15 and 16 is similar to that just described, but is straight along each side of the shafts of the soldering-irons and above the latter and may be in contact with the said irons when they are raised, if desired. The said irons should be shorter in this case, as the working end of the iron is not brought so near the conductor when the latter is in this position. When the heating-conductor is on the exterior of the soldering-iron, the electric connections will not pass through the presser-iron, and the latter may then be made solid.

In Fig. 17 I have shown a rotary can-capping machine. This apparatus is constructed so that some of the caps are being soldered to the cans while others are cooling and still others are being prepared for the soldering operation—as, for instance, by placing the cap on the can and applying the flux and the solder thereto. In this machine, also, pressure is maintained upon the cap after the soldering-iron is removed from the joint to permit the solder to cool, after which the pressure is automatically removed from the cap and the finished can is taken from the machine and replaced by an unsoldered can. The heating-conductor of this machine is preferably stationary with the cans and the same as or similar to the conductor shown in Figs. 12, 13, and 14, but rotates with the rotating part of the apparatus. The said apparatus is rotated by means of a mitered cog-wheel $t$, keyed to the vertical central shaft U below the can-table. The cog-wheel $t$ is shown in mesh with a smaller mitered cog-wheel $t'$ on a horizontal shaft $t''$, which is driven by any power, and is mounted in a bearing $y$, bolted to the base of the stationary frame of the machine. The electric current is conveyed to the heating-conductor by means of stationary brushes $b''$ $b''$, secured to binding-posts on the top of the frame and connected to the terminals of the electric circuit. The brushes extend to and bear with their free ends upon metal rings $i$ and $i'$, insulated from each other and mounted upon the central shaft to be turned therewith. The terminals of the said heating-conductor are connected, as shown by the dotted lines $u$, with the said rings. The current flows continuously through the heating-conductor. The same letters of reference are employed in this figure that were used in the other figures to denote corresponding parts. The soldering-irons and accompanying devices are arranged in a circle around the central shaft U. For the sake of simplicity the said irons are shown as rotated by a single stationary belt or chain secured at $w$ to the frame and passing around all the pulleys, which are not in this case raised and lowered with the soldering-irons, but are simply connected thereto by splines and grooves, so that they will continually rest upon the disk B, carrying the shaft-bearings C C. I do not limit myself to this arrangement, however, as any other suitable and well-known means may be employed to revolve the soldering-irons. The soldering-irons are not raised by a lever in this rotary machine, but by a cam-shaped stationary strip R, supported from the top of the frame. This cam or cam-shaped strip R has two levels, one somewhat higher than the other, and engages with small disks fixed to the top of the tubes D successively, first raising the soldering-iron from the can, allowing the presser-iron to remain upon the cap for a short time, and then raising both irons clear from the can to allow its removal from the machine and the insertion therein of another. The said cam preferably extends the entire distance around the apparatus. The irons are shown down, resting upon the caps and cans at the right-hand side of the figure, which cans are in process of being soldered. At the center of the figure several disks have been lifted by the cam and the soldering-irons raised from the cans, while the presser-irons remain on the caps, so that the solder at the joint will cool before pressure is removed. At the left of the figure the soldering-irons are shown raised still higher and the presser-irons raised more or less, so that the soldered cans may be removed and unsoldered cans inserted in their place. The soldering-irons may not be continuously revolved, but only when lowered upon the solder or can.

It will be obvious that my method may be also used for soldering together any of the parts of a can or similar article without departing from my invention. Further than this, I would have it understood that if the can is made to rotate or revolve under the soldering-iron while the latter is held stationary it will be equivalent to rotating the iron while the can is stationary.

The apparatus herein shown is not specifically claimed, as it forms the subject of another application, Serial No. 366,308, filed by me on the same date as the present application.

What I claim as my invention, and desire to secure by Letters Patent, is—

1. The herein-described improvement in soldering or cementing operations in which heat is employed to heat the soldering or cementing material, consisting in heating the soldering-tool by passing a heating electric current through a conductor in close proximity or contiguous to the tool while it is remote from the work and then moving the tool from said conductor and bringing the tool in contact with the work or the junction of pieces supplied with solder.

2. The herein-described improvement in soldering or cementing operations in which heat is employed to heat the soldering or cementing material, consisting in heating the soldering-tool by passing a heating electric current through a conductor in contact with or in close proximity to the tool while it is remote from the work, then moving the tool from said conductor, bringing the tool in contact with the work or the junction of pieces supplied with solder, and moving said tool along the junction.

3. The herein-described improvement in soldering or cementing operations in which heat is employed to heat the soldering or cementing material, consisting in heating the soldering-tool by passing a heating electric current through a conductor in contact with or in close proximity to the tool while it is remote from the work, then moving the tool from said conductor, bringing the tool in contact with the work or the junction of the pieces supplied with solder, moving said tool along the junction, removing the tool from the junction, and maintaining pressure upon the parts while they are cooling.

4. The herein-described improvement in soldering or cementing operations in which heat is employed to soften the soldering or cementing material, consisting in suitably electrically heating a rotatable or revolving soldering-tool while it is remote from the work, then bringing the tool and work in contact with each other, and then separating the tool and work from each other and permitting the latter to cool.

5. The herein-described improvement in soldering or cementing operations in which heat is employed to soften the soldering or cementing material, consisting in suitably electrically heating a rotatable or revolving soldering-tool while it is remote from the work, applying pressure to the work to press the parts toward each other, then bringing the tool and work in contact with each other, and then separating the tool and work from each other and permitting the latter to cool under pressure.

6. The herein-described improvement in soldering or cementing operations in which heat is employed to soften the soldering or cementing material, consisting in electrically heating a rotatable or revolving soldering-tool while it is remote from the work by passing an electric current through a heating-conductor, then bringing the tool and work in contact with each other, and then separating the tool and work from each other and permitting the latter to cool.

In testimony whereof I have hereunto signed my name this 18th day of September, 1890.

MARK W. DEWEY. [L. S.]

Witnesses:
C. H. DUELL,
H. M. SEAMANS.